US008935689B2

(12) United States Patent
Evans et al.

(10) Patent No.: US 8,935,689 B2
(45) Date of Patent: Jan. 13, 2015

(54) CONCURRENT EMBEDDED APPLICATION UPDATE AND MIGRATION

(75) Inventors: David H. Evans, Lexington, KY (US); David W. Glass, Georgetown, KY (US); Martin Thiim, Frederiksburg C (DK); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/572,772

(22) Filed: Aug. 13, 2012

(65) Prior Publication Data

US 2014/0047427 A1 Feb. 13, 2014

(51) Int. Cl.
*G06F 9/44* (2006.01)
*G06F 15/173* (2006.01)
*G06F 13/00* (2006.01)
*H04M 11/00* (2006.01)

(52) U.S. Cl.
USPC ........... 717/170; 117/168; 709/238; 711/100; 379/88.18

(58) Field of Classification Search
CPC ............... G06F 8/60; G06F 8/65; G06F 8/67; G06F 8/68; G06F 9/445; G06F 11/1433
See application file for complete search history.

(56) References Cited

U.S. PATENT DOCUMENTS

| | | | |
|---|---|---|---|
| 6,081,665 A | 6/2000 | Nilsen et al. | |
| 6,289,506 B1 | 9/2001 | Kwong et al. | |
| 6,292,935 B1 | 9/2001 | Lueh et al. | |
| 6,295,638 B1 | 9/2001 | Brown et al. | |
| 6,295,641 B1 | 9/2001 | Beadle et al. | |
| 6,336,213 B1 | 1/2002 | Beadle et al. | |
| 6,370,687 B1 | 4/2002 | Shimura | |
| 6,530,075 B1 | 3/2003 | Beadle et al. | |
| 6,637,025 B1 | 10/2003 | Beadle et al. | |
| 6,675,258 B1 | 1/2004 | Bramhall et al. | |
| 6,851,109 B1 | 2/2005 | Alexander, III et al. | |
| 7,219,343 B2 | 5/2007 | Almeida et al. | |
| 7,457,945 B2 | 11/2008 | Dailey et al. | |
| 8,041,988 B2 | 10/2011 | Tarra et al. | |
| 2003/0217171 A1 | 11/2003 | Von Stuermer et al. | |

(Continued)

FOREIGN PATENT DOCUMENTS

JP 2006119901 A 5/2006

OTHER PUBLICATIONS

Disclosed Anonymously, "Cryptographic Architecture to Improve the Mainframe Micro Code Load (MCL) Update Process", Sep. 26, 2012, IP.com [online], [retrieved on Oct. 16, 2012]. Retrieved from: Prior Art Database, IP.com No. IPCOM000222357D.

(Continued)

*Primary Examiner* — Don Wong
*Assistant Examiner* — Mohammad Kabir
(74) *Attorney, Agent, or Firm* — Isaac J. Gooshaw (57) ABSTRACT

Embodiments of the present invention provide a system, method, and computer program product for updating software on an embedded computer device. According to one aspect of the present invention, a concurrent embedded application update is performed in which selected state information for one or both of an embedded virtual machine and a plurality of applets on an embedded computer device is securely exported to a host computer device. After software updates have been installed, the selected state information can be restored on the embedded computer device from which it was exported and/or it can be migrated to a second embedded computer device.

20 Claims, 7 Drawing Sheets

(56) References Cited

U.S. PATENT DOCUMENTS

| | | | |
|---|---|---|---|
| 2004/0015940 A1 | 1/2004 | Heisey et al. | |
| 2005/0160257 A1 | 7/2005 | Kruger et al. | |
| 2006/0123207 A1* | 6/2006 | Yamamoto et al. | 711/161 |
| 2006/0143600 A1 | 6/2006 | Cottrell et al. | |
| 2007/0061779 A1 | 3/2007 | Dowedeit et al. | |
| 2007/0198656 A1* | 8/2007 | Mazzaferri et al. | 709/218 |
| 2008/0263350 A1 | 10/2008 | Haverkamp et al. | |
| 2008/0270674 A1* | 10/2008 | Ginzton | 711/6 |
| 2009/0080013 A1 | 3/2009 | Sato et al. | |
| 2010/0088281 A1 | 4/2010 | Driesen et al. | |
| 2010/0293591 A1 | 11/2010 | Shah | |
| 2010/0333081 A1 | 12/2010 | Etchegoyen | |
| 2011/0026714 A1* | 2/2011 | Thomas et al. | 380/278 |
| 2011/0289493 A1* | 11/2011 | Keefe et al. | 717/168 |
| 2011/0321023 A1 | 12/2011 | Hocker et al. | |
| 2012/0272056 A1* | 10/2012 | Ganesan | 713/156 |
| 2013/0064357 A1* | 3/2013 | Hao et al. | 379/88.11 |
| 2013/0139140 A1* | 5/2013 | Rao et al. | 717/170 |

OTHER PUBLICATIONS

IEEE, "CCNC" Fifth Annual IEEE Consumer Communications & Networking Conference 2008, Jan. 10-12, cms.comsoc.org [online], [retrieved on Apr. 23, 2012]. Retrieved from the Internet <URL: http://cms.comsoc.org/CCNC_2008/Content/Home/Conf_Program/Demonstrations.html>.

Vandewoude et al., "An Overview and Assessment of Dynamic Update Methods for Component-Oriented Embedded Systems" Proceedings of the International Conference on Software engineering Research and Practice, 2002 [online], [retrieved on May 1, 2012]. Retrieved from the Internet <URL: http://distrinet.cs.kuleuven.be/projects/SEESCOA/publications/OverviewDUComponentsSERP2002.pdf>.

VMWARE Inc., "VMware vMotion for Live Migration of Virtual Machines" vmware.com, Copyright © 2012 [online], [retrieved on May 1, 2012]. Retrieved from the Internet <URL: http://www.vmware.com/products/vmotion/overview.html>.

Wahler et al., "Dynamic Software Updates for Real-Time Systems" Proceedings of the 2nd International Workshop on Hot Topics in Software Upgrades HotSWUp'09, Oct. 25, 2009 [online], [retrieved on May 1, 2012]. Retrieved from the Internet <URL: http://www.cs.cmu.edu/~tdumitra/hotswup09/papers/hotswup09_submission_8.pdf>.

Notice of Allowance for U.S. Appl. No. 12/822,799, dated Jul. 10, 2012.

* cited by examiner

CONCURRENT EMBEDDED APPLICATION UPDATE AND MIGRATION

FIELD OF THE INVENTION

The present invention relates generally to computer devices and, more particularly, to concurrently updating embedded applications on embedded computer devices.

BACKGROUND

Embedded computer devices, such as smartcards, typically contain one or more computer processors, memory, and other embedded hardware and software components. The software components typically include embedded applications, such as an embedded Java Virtual Machine ("eJVM") and multiple applets.

It is often desirable to update embedded applications on an embedded computer device while the embedded applications are in communication with an external host application such that the embedded applications continue to run uninterrupted from the perspective of the external host application. This process is referred to as a concurrent embedded application update ("CEAU"). For example, a user may wish to utilize a CEAU to update an eJVM and applets embedded on a smartcard without rendering the smartcard unable to process requests from the perspective of a host application that is running on a host computer device.

To perform a CEAU, certain state information typically must be preserved so that it can later be restored and the embedded computer device can resume operating after the CEAU is complete. For example, state information for a smartcard may include the in-RAM state of the eJVM and the applets, which can include live objects and values of static fields. One known technique for preserving state information involves storing state information in persistent storage on the embedded computer device, such as in flash memory. However, accessing flash to later restore the information can be a slow process, and flash memory can degrade with use. Further, an eJVM and its applets can possess large amounts of state information, potentially to the extent that the amount of state information exceeds the persistent storage capacity of the embedded computer device and therefore cannot be entirely preserved. For example, embedded applications that perform cryptographic functions may manage large cryptographic key pools whose storage size exceeds the storage capacity of the flash memory on the embedded computer device.

A known alternative to preserving state information during a CEAU is to rebuild the state information after the CEAU is complete. However, for certain state information, such as cryptographic state information, rebuilding the information can be prohibitively expensive with respect to system resources, resulting in time delays that prevent a CEAU from being performed without interruption from the perspective of a host application.

SUMMARY

Embodiments of the present invention provide a system, method, and computer program product for updating software on an embedded computer device. According to one aspect of the present invention, an embedded computer device executes an applet in an embedded virtual machine. The embedded computer device suspends new requests to the applet, and transmits state information for one or both of the embedded virtual machine and the applet to a host computer device for temporary storage. The embedded computer device receives one or more software updates for one or both of the embedded virtual machine and the applet from the host computer device. The embedded computer device then installs the one or more software updates received from the host computer device. Subsequently, the embedded computer device receives the state information from the host computer device, restores it on the embedded computer device, and allows new requests to be sent to the applet.

DETAILED DESCRIPTION

Embodiments of the present invention will now be described in detail with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Therefore, specific structural and functional details disclosed herein are not to be interpreted as limiting, but merely as a representative basis for teaching one skilled in the art to variously employ the present invention.

Figure 1:
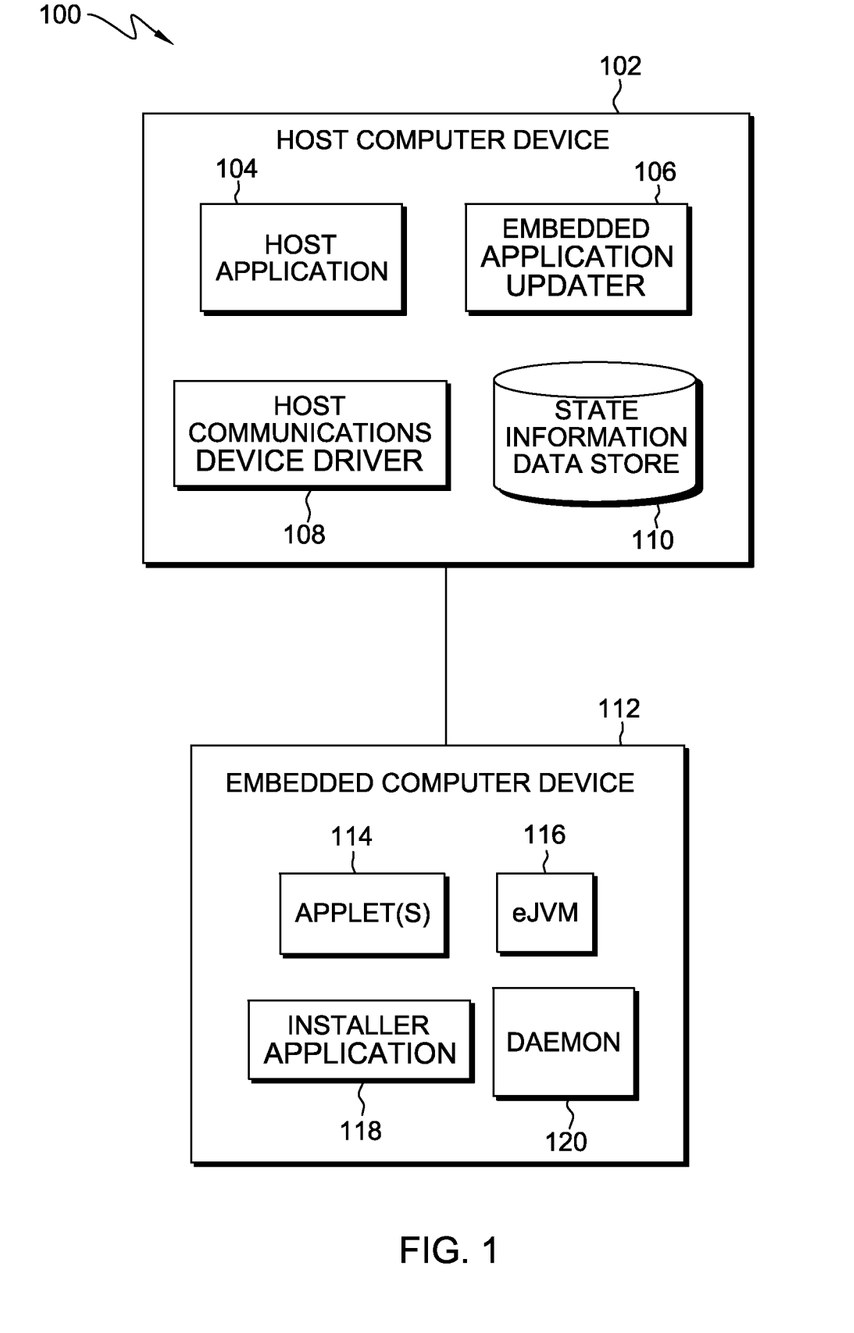
FIG. 1 is a block diagram of a concurrent embedded application update system in accordance with an embodiment of the present invention.

FIG. 1 is a functional block diagram illustrating a concurrent embedded application update system 100 in accordance with an embodiment of the present invention. Concurrent embedded application update system 100 includes a host computer device 102 and an embedded computer device 112. Host computer device 102 can be a cellular telephone, tablet computer, laptop computer, desktop computer, specialized computer server, or any other computer device known in the art. In general, host computer device 102 can be any programmable electronic device as described in further detail with regard to FIG. 9. Embedded computer device 112 can be a smartcard, subscriber identity module (SIM) card, credit card, security badge, or any other computer device having embedded hardware and software components. In general, embedded computer device 112 can be any programmable electronic device as described in further detail with regard to FIG. 8.

Host computer device 102 and embedded computer device 112 are interconnected. In some embodiments, embedded computer device 112 is internal to host computer device 102. In other embodiments, embedded computer device 112 is external to host computer device 102 and is connected to host computer device 102 using an acceptance device such as a universal serial bus (USB) smartcard reader. In other embodiments, embedded computer device 112 is connected to host computer device 102 via a network such as a local area network (LAN), a wide area network (WAN) such as the Internet, or a combination of the two, and includes wired, wireless, or fiber optic connections. In general, host computer device 102 can be connected to embedded computer device 112 with any combination of connections and protocols that support communications in accordance with embodiments of the present invention.

Host computer device 102 includes host application 104, embedded application updater 106, host communications device driver 108, and state information data store 110. Host application 104, via host communications device driver 108, provides access to services and functionalities of one or more applets 114 on embedded computer device 112. For example, host application 104 can issue requests to, and receive responses from, one or more applets 114 on embedded computer device 112.

Embedded application updater 106 is a program that provides software updates to embedded computer device 112 in accordance with embodiments of the present invention. For example, during a CEAU, embedded application updater 106 provides to embedded computer device 112 software updates for one or more applets 114 and/or eJVM 116. Embedded application updater 106 obtains the software updates from local storage on host computer device 102 and/or from storage on a remote computer device via a network.

Host communications device driver 108 enables host application 104 and embedded application updater 106 to communicate with embedded computer device 112. During a CEAU, host communications device driver 108 initiates suspension of embedded computer device 112 by transmitting a suspend instruction to eJVM 116 and, in response, receives from eJVM 116 state information for temporary storage in state information data store 110. Host communications device driver 108 also queues requests received from host application 104 (and/or other applications on host computer device 102) that are made to one or more applets 114 while embedded computer device 112 is in a suspension state.

Embedded computer device 112 includes one or more applets 114, embedded java virtual machine (eJVM) 116, installer application 118, and daemon 120. One or more applets 114 are one or more software applications that are stored on embedded computer device 112 and are executable by eJVM 116 in accordance with embodiments of the present invention. In this exemplary embodiment, eJVM 116 is an embedded java virtual machine capable of executing one or more applets 114 as java bytecode. In general, eJVM 116 can be implemented with any embedded virtual machine (i.e., any bytecode interpreter) known in the art. During a CEAU, eJVM 116 preserves selected state information for eJVM 116 and/or one or more applets 114 by exporting the state information to host computer device 102. Later, eJVM 116 receives the state information from host computer device 102 and restores the state information on embedded computer device 112. In certain embodiments, a migration is performed in which the state information is restored on a second embedded computer device 112, as discussed later in this specification. Those skilled in the art will recognize that eJVM 116 may also include components that are not illustrated in FIG. 1, such as, for example, extensions and a runtime environment including system classes, application programming interfaces (APIs), and native methods for hardware components of embedded computer device 112.

Installer application 118 receives updates for one or more applets 114 and/or eJVM 116 from embedded application updater 106 and installs the updates on embedded computer device 112 in accordance with embodiments of the present invention.

Daemon 120 runs as a background service (i.e., program) on embedded computer device 112 and maintains a timestamp field on embedded computer device 112 in accordance with embodiments of the present invention. In certain embodiments, daemon 120 stores a timestamp of the time at which eJVM 116 exports state information. The timestamp is verified by daemon 120 during restoration of the state information as an added security measure to decrease the likelihood of unauthorized replication of the state information on another embedded computer device (e.g., a replay attack).

It should be understood that, for the purposes of illustration, FIG. 1 does not show additional computer devices and elements which may be present when practicing embodiments of the present invention. For example, when performing a CEAU and migration in accordance with an embodiment of the present invention, one or more updates are installed on, and the state information is migrated to, a second embedded computer device 112.

Figure 2:
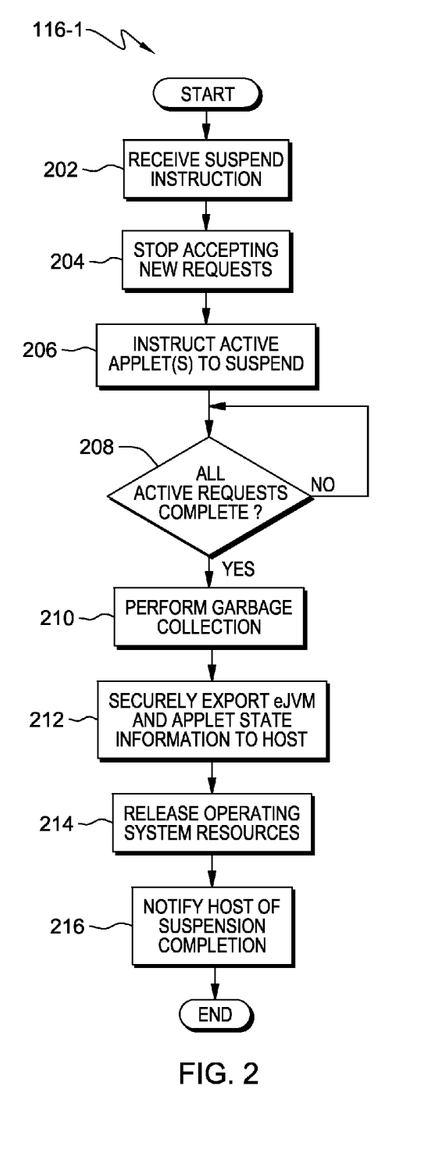
FIG. 2 is a flowchart illustrating the function and operational steps of the embedded Java virtual machine of FIG. 1 for suspending the embedded computer device of FIG. 1 during a concurrent embedded application update in accordance with an embodiment of the present invention.

FIG. 2 is a flowchart 116-1 of the function and operational steps of eJVM 116 for suspending embedded computer device 112 during a CEAU in accordance with an embodiment of the present invention. In step 202, eJVM 116 receives a suspend instruction transmitted from host communications device driver 108 which instructs eJVM 116 to enter into a suspension state.

In step 204, in response to receiving the suspend instruction, eJVM 116 stops accepting new requests made by host application 104 to one or more applets 114. That is, eJVM 116 suspends requests (i.e., calls) to one or more applets 114 that were made after receipt of the suspend instruction from host communications device driver 108. Host communications device driver 108 queues new requests made by host application 104 to one or more applets 114.

In step 206, eJVM 116 instructs all active applets (i.e., one or more applets 114 that are currently executing active requests) to suspend operation after the active applets have finished executing their active requests.

In step 208, eJVM 116 periodically determines whether all active requests are complete (i.e., whether the active applets have finished executing their active requests). If, in step 206, eJVM 116 determines that all active requests are not complete, then eJVM 116 continues to allow the active applets to finish executing their active requests. If, in step 206, eJVM 116 determines that all active requests are complete, then, in step 210, eJVM 116 performs garbage collection, where appropriate. In this exemplary embodiment, for example, garbage collection is performed to reclaim memory on embedded computer device 112 that is occupied by data objects that were no longer being used by one or more applets 114 and/or eJVM 116 prior to receipt of the suspend instruction from host communications device driver 108.

In step 212, eJVM 116 selects and securely exports state information for one or more applets 114 and/or eJVM 116 to host computer device 102, via host communications device driver 108, for temporary storage in state information data store 110. State information can include, for example, the in-RAM state of eJVM 116 itself, state information pertaining to native methods and code for embedded computer device 112, and the in-RAM state of one or more applets 114, including all live objects and values of static fields. During a prior set up phase, a user of concurrent embedded application update system 100 can specify which state information should be exported to host computer device 102 on the basis of, for example, whether the state information exceeds the persistent storage capacity of embedded computer device 112 and/or whether the state information would be prohibitively expensive to rebuild with respect to system resources. Operational steps for securely exporting state information in accordance with an embodiment of the present invention are discussed in greater detail with regard to FIG. 4.

In step 214, eJVM 116 releases any held operating system resources on embedded computer device 102. For example, the released operating system resources may include semaphores, file handles, and other data related to currently opened files.

In step 216, eJVM 116 transmits a notification to host communications device driver 108 indicating that suspension is complete.

Figure 3:
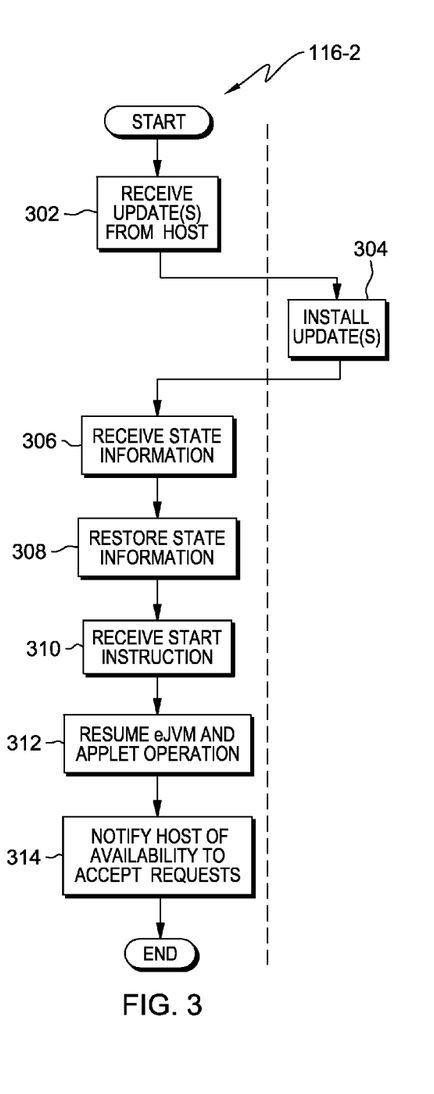
FIG. 3 is a flowchart illustrating the function and operational steps of the embedded Java virtual machine of FIG. 1 for installing updates and resuming operation of the embedded computer device of FIG. 1 during a concurrent embedded application update in accordance with an embodiment of the present invention.

FIG. 3 is a flowchart 116-2 illustrating the function and operational steps of eJVM 116 for installing updates to one or more applets 114 and eJVM 116 and resuming operation in accordance with an embodiment of the present invention. In this exemplary embodiment, the operational steps of FIG. 3 are performed after embedded computer device 112 has been suspended in accordance with the operational steps of FIG. 2. In embodiments where a CEAU and migration procedure are being performed, a second embedded computer device 112 performs the operational steps of FIG. 3, as discussed in greater detail with regard to FIG. 7.

In step 302, installer application 118 receives from embedded application updater 106 one or more updates for one or more applets 114 and eJVM 116 and calls installer application 118. In step 304, installer application 118 installs the received one or more updates.

In step 306, eJVM 116, having been updated, requests and receives from host communications driver 108 the state information stored in state information data store 110 (i.e., the state information that was exported in step 212 of FIG. 2). In certain embodiments of the present invention, prior to receiving the state information, eJVM 116 must first authenticate itself using, for example, a digital certificate.

In step 308, eJVM 116 restores the received state information on embedded computer device 112 and notifies host communications device driver 108. In this exemplary embodiment, eJVM 116 restores the state of eJVM 116 and one or more applets 114. Operational steps for restoring state information in accordance with an embodiment of the present invention are discussed in greater detail with regard to FIG. 5.

After the state information has been restored, in step 310, eJVM 116 receives a start instruction from host communications device driver 108. In step 312, eJVM 116 resumes operation and sends a resume instruction to each active applet of one or more applets 114 that was suspended in step 206 of FIG. 2, upon which the active applets can rebuild any portion of their states that was not restored in step 308. For example, the active applets may rebuild one or more caches that were eliminated during suspension in step 206 of FIG. 2.

After eJVM 116 and one or more applets 114 have resumed operation, in step 314, eJVM 116 transmits a notification to host communications device driver 108 indicating that embedded computer device 112 is available to accept new requests. After step 314, host communications device driver 108 can transmit to eJVM 116 any requests that may have been queued while embedded computer device 112 was suspended.

Accordingly, by performing the operational steps of FIGS. 2 and 3, one or more applets 114 and/or eJVM 116 are updated on embedded computer device 112. Because state information was exported for storage on host computer device 102, embodiments of the present invention can preserve larger amounts of state information than might otherwise be possible given a limited storage capacity of embedded computer device 112. Preserving such state information reduces the need to expend system resources and time rebuilding the state information, which enables the CEAU to be performed without interruption from the perspective of host application 104. Further, certain embodiments of the present invention involve a migration in which the preserved state information is restored on a second embedded computer device 112, as discussed in greater detail with regard to FIG. 7.

Figure 4:
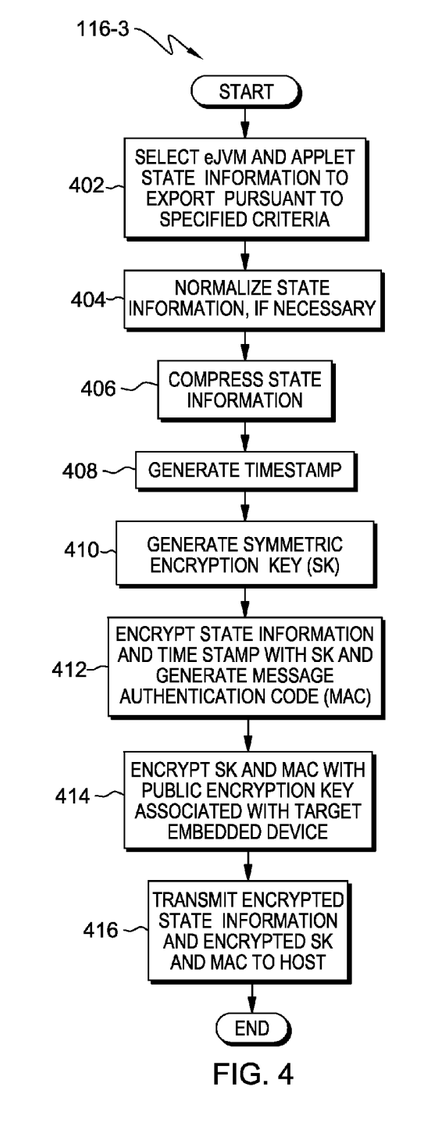
FIG. 4 is a flowchart illustrating the function and operational steps of the embedded Java virtual machine of FIG. 1 for exporting state information during a concurrent embedded application update in accordance with an embodiment of the present invention.

FIG. 4 is a flowchart 116-3 illustrating the function and operational steps of eJVM 116 to export state information in accordance with an embodiment of the present invention at step 212 of FIG. 2.

In step 402, eJVM 116 selects state information for eJVM 116 and one or more applets 114 to export to host computer device 102 pursuant to specified criteria. A user of concurrent embedded application update system 100 can specify such criteria on a variety of bases. For example, the user can specify that state information should be exported to host computer device 102 if preservation of the entirety of the state information, or the entirety of a discrete portion of the state information, would require more persistent storage than is available on embedded computer device 112. The user can also specify that specific kinds of state information, or state information belonging to specific kinds of one or more applets 114, should be exported to host computer device 102. These criteria can be useful, for example, to export specific state information that is anticipated by the user to be expensive and time-consuming to rebuild, such as a large RSA keypool or other cryptographic state information belonging to applets that perform cryptographic functions. The user can also specify that all state information should be exported to embedded computer device 102.

In step 404, eJVM 116 normalizes the state information selected in step 402, if necessary. In this exemplary embodiment, normalization includes compacting the eJVM heap (i.e., the region of memory used by eJVM 116) and creating a relocation table. For example, if in step 210 of FIG. 2, garbage collection results in fragmentation of the eJVM heap, eJVM 116 can compact the heap by moving the remaining live objects such that they are consolidated in a particular region of the heap, thereby creating a region of contiguous free space in the heap. The object handle for each moved object, which is stored in the relocation table and is referenced by applications, points to the new location of the object in the eJVM heap.

In step 406, eJVM 116 compresses the state information. In this exemplary embodiment, eJVM 116 utilizes zlib compression. In general, any suitable compression technique that is known in the art can be utilized.

After compression is complete, in step 408, eJVM 116 calls daemon 120 to generate and store a timestamp on embedded computer device 112 such that it persists during the CEAU. For example, the timestamp can be stored in battery-backed RAM (BBRAM).

In step 410, eJVM 116 generates a symmetric encryption key (SK). In this exemplary embodiment, the AES symmetric encryption algorithm is utilized. In general, any symmetric encryption algorithm can be utilized.

In step 412, eJVM 116 encrypts the compressed state information and timestamp with the SK generated in step 410, and eJVM 116 generates a message authentication code (MAC). In other embodiments, symmetric encryption and generation of the MAC can be accomplished using a combination technique, such as, for example, Counter with CBC-MAC (CCM).

In step 414, eJVM 116 encrypts the SK and MAC with a public encryption key of an asymmetric encryption key pair that is associated with the target embedded computer device. In this exemplary embodiment, eJVM 116 uses the RSA asymmetric encryption algorithm. The target embedded computer device is the embedded computer device 112 on which the state information will be decrypted and restored. Accordingly, during a CEAU that does not involve migration, embedded computer device 112 encrypts the SK and MAC with its own public encryption key (i.e., the public encryption key for which it has the corresponding private encryption key); during a CEAU that involves migration, embedded computer device 112 encrypts the SK and MAC with a public encryption key that is associated with a second embedded computer device 112, as the second embedded computer device 112 is the target embedded computer device.

In step 416, eJVM 116 transmits to host computer device 102 for temporary storage in state information data store 110 the encrypted state information and the encrypted SK and MAC.

Figure 5:
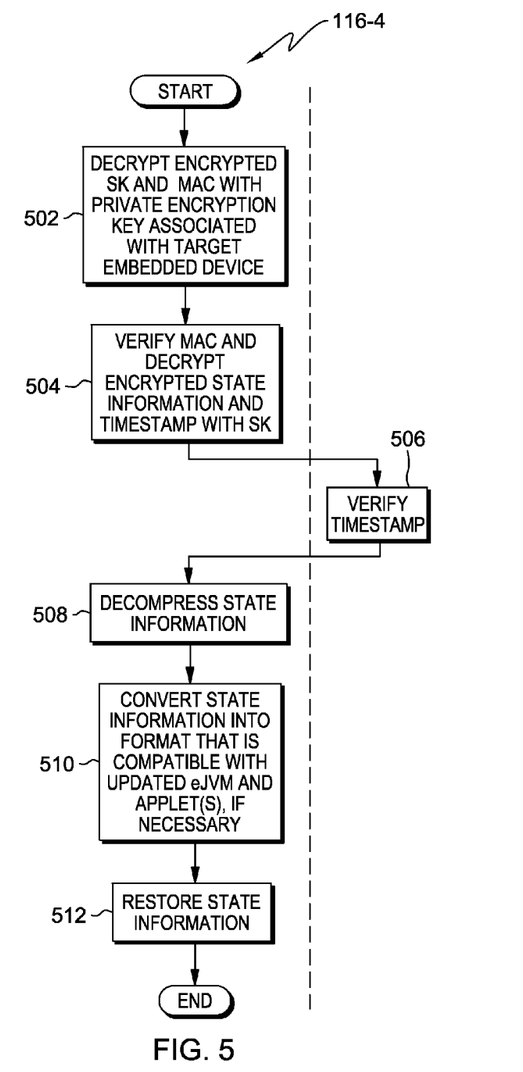
FIG. 5 is a flowchart illustrating the function and operational steps of the embedded Java virtual machine of FIG. 1 for restoring state information during a concurrent embedded application update in accordance with an embodiment of the present invention.

FIG. 5 is a flowchart 116-4 illustrating the function and operational steps of eJVM 116 for restoring state information on a target embedded computer device 112 in accordance with an embodiment of the present invention at step 308 of FIG. 3, subsequent to the exportation of selected state information in accordance with the operational steps of FIG. 4. As discussed earlier, where the CEAU does not involve migration, the target embedded computer device 112 performing the operational steps of FIG. 5 is the embedded computer device 112 that performed the operational steps of FIG. 4; where the CEAU involves migration, the target embedded computer device 112 is a second embedded computer device 112 that did not perform the operational steps of FIG. 4.

In step 502, eJVM 116 decrypts the SK and MAC with the private encryption key associated with the target embedded device 112. That is, eJVM 116 decrypts the SK and MAC with the private encryption key that corresponds to the public encryption key with which the SK and MAC were encrypted in step 414 of FIG. 4.

In step 504, eJVM 116 verifies the MAC for the encrypted state information and timestamp, and eJVM 116 decrypts the encrypted state information and timestamp with the SK. After decryption is complete, eJVM 116 calls daemon 120 to verify the decrypted timestamp.

In step 506, daemon 120 verifies the decrypted timestamp. If the CEAU does not involve migration (i.e., the target embedded computer device 112 also performed the operational steps of FIG. 4), daemon 120 verifies the decrypted timestamp by comparing the decrypted timestamp to the timestamp stored in step 408 of FIG. 4 to identify a match. If the CEAU does involve migration, daemon 120 verifies the decrypted timestamp by receiving the stored timestamp from the embedded computer device 112 that performed the operational steps of FIG. 4 and comparing the received timestamp to the decrypted timestamp to identify a match. In either scenario, verification of the timestamp requires having the timestamp that was generated in step 408 of FIG. 4, and therefore helps decrease the likelihood of unauthorized replication of the state information on an embedded computer device other than the target embedded computer device 112 (e.g., a replay attack).

In step 508, eJVM 116 decompresses the decrypted state information and, in step 510, converts the state information into a format that is compatible with the now updated eJVM 116 and one or more applets 114, if necessary. That is, depending on the nature of the state information and the updates to eJVM 116 and one or more applets 114, eJVM 116 and one or more applets 114 may be able to resume operations utilizing the state information as-is, or the state information may need to be converted into a compatible format.

In step 512, eJVM 116 restores the state information on the target embedded computer device 112 and, where necessary, updates the state information in accordance with the relocation table to reflect the new locations of any objects in the eJVM heap that were moved during normalization of the state information in step 404 of FIG. 4. eJVM 116 also notifies host communications device driver 108 that the restoration is complete.

Accordingly, the operational steps of FIGS. 4 and 5 enable selected state information to be securely exported and restored on an embedded computer device 112, including securely migrating the selected state information to a second embedded computer device 112. Because the state information is transmitted in a cryptographically secure manner, embodiments of the present invention can be utilized to perform a CEAU and migration that involves sensitive state information, such as cryptographic state information, with a decreased risk of unauthorized access to and/or replication of the sensitive state information.

Figure 6:
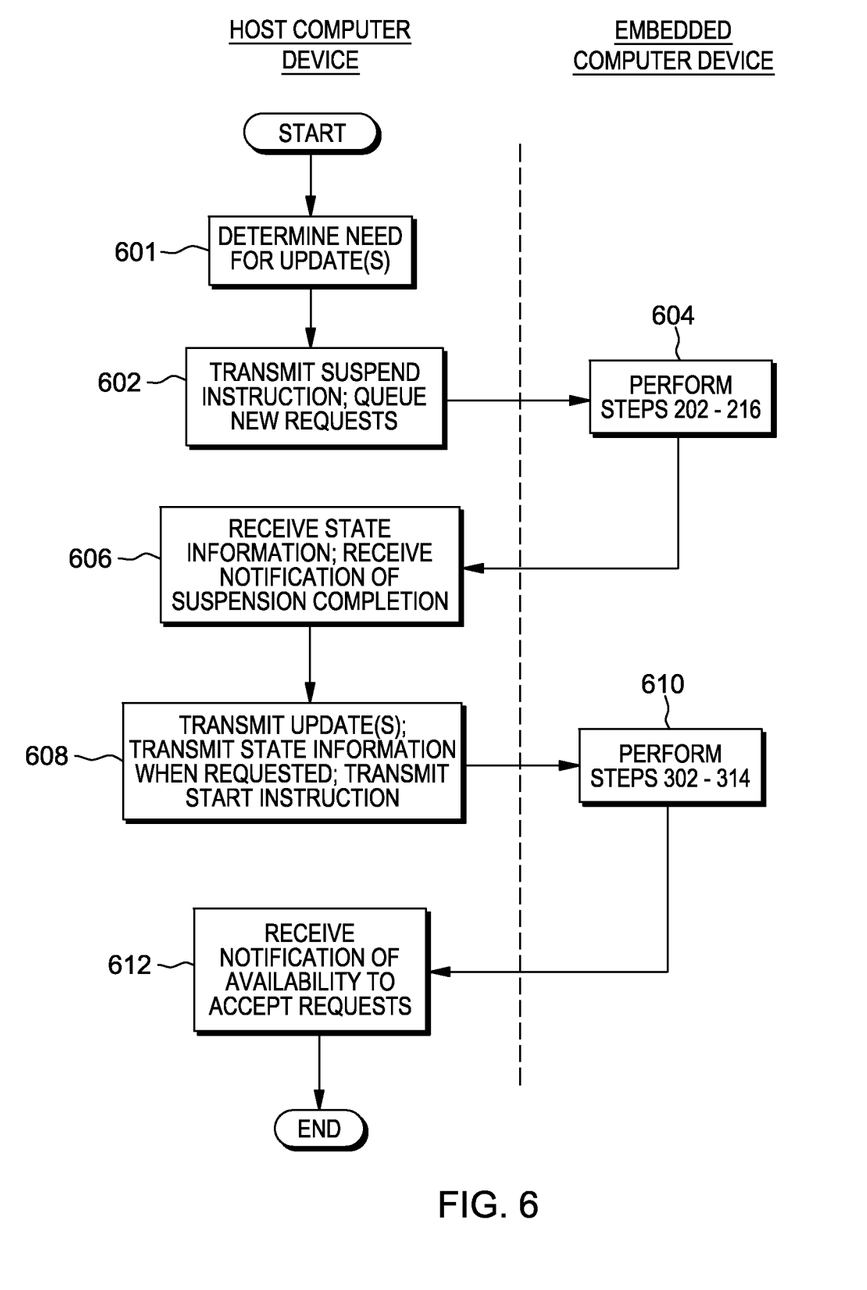
FIG. 6 is a flowchart illustrating operational steps for performing a current embedded application update in accordance with an embodiment of the present invention.

FIG. 6 is a flowchart illustrating operational steps for performing a CEAU in accordance with an embodiment of the present invention. In step 601, host communications device driver 108 determines that one or more applets 114 and/or eJVM 116 need to be updated. For example, host communications device driver 108 may determine that eJVM 116 and/or one or more applets 114 need to be updated on the basis of an update schedule, receiving a command from a user of host computer device 102, or receiving a command from an application on host computer device 102, such as embedded application updater 106. In step 602, host communications device driver 108 transmits a suspend instruction to eJVM 116 and creates a queue for any new requests made to one or more applets 114.

In step 604, embedded computer device 112 performs the operational steps of FIG. 2 (i.e., steps 202 through 216), as previously discussed. In step 606, during the performance of the operational steps of FIG. 2, host communications device driver 108 receives from eJVM 116 the exported state information for eJVM 116 and one or more applets 114 and stores the state information in state information data store 110. Also, host communications device driver 108 receives from eJVM 116 the notification indicating that suspension is complete.

In step 608, embedded application updater 106 transmits to installer application 118 one or more updates for eJVM 116 and/or one or more applets 114 and, in step 610, embedded computer device 112 performs the operational steps of FIG. 3 (i.e., steps 302 through 314), as previously discussed. During the performance of the operational steps of FIG. 3, host communications device driver 108 transmits the state information stored in state information data store 110 to eJVM 116 when requested, and host communications device driver 108 transmits a start instruction to eJVM 116 after restoration of the state information is complete.

In step 612, host communications device driver 108 receives from eJVM 116 the notification indicating that embedded computer device 112 is available to accept new requests. After step 612, host communications device driver 108 can then transmit to eJVM 116 any requests that have been queued while embedded computer device 112 was suspended.

Figure 7:
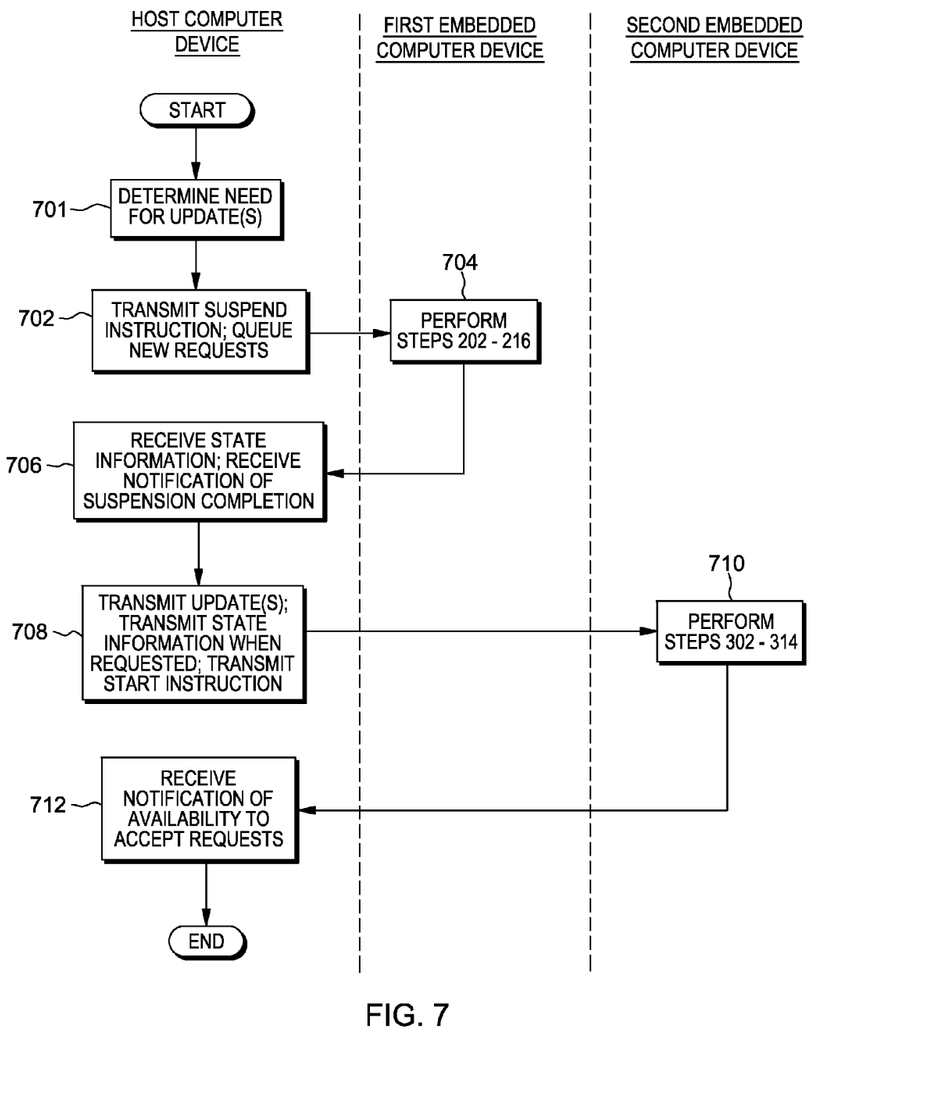
FIG. 7 is a flowchart illustrating operational steps for performing a concurrent embedded application update and migration in accordance with an embodiment of the present invention.

FIG. 7 is a flowchart illustrating operational steps for performing a CEAU and migration in accordance with an embodiment of the present invention. For example, this embodiment can be useful where the hardware components on the first embedded computer device 112 are reaching the end of their intended life span, and a user wishes to migrate eJVM 116 and one or more applets 114 from the first embedded computer device 112 to the second embedded computer device 112, without downtime or interruption from the perspective of host application 104.

In step 701, host communications device driver 108 determines that one or more applets 114 and/or eJVM 116 need to be updated on the second embedded computer device 112. As previously discussed, this determination can be based on, for example, an update schedule, receiving a command from a user of host computer device 102, or receiving a command from an application on host computer device 102. In step 702, host communications device driver 108 transmits a suspend instruction to eJVM 116 on the first embedded computer device 112 and then begins queuing any new requests made to one or more applets 114 on the first embedded computer device.

In step 704, the first embedded computer device 112 performs the operational steps of FIG. 2, as previously discussed. In step 706, during the performance of the operational steps of FIG. 2, host communications device driver 108 receives from eJVM 116 the exported state information for eJVM 116 and one or more applets 114 on the first embedded computer device 112, and host communications device driver 108 stores the state information in state information data store 100. Also, host communications device driver 108 receives from eJVM 116 on the first embedded computer device 112 a notification indicating that suspension is complete.

In step 708, embedded application updater 106 transmits to installer application 118 on the second embedded computer device 112 one or more updates for eJVM 116 and/or one or more applets 114 on the second embedded computer device 112. That is, in this exemplary embodiment, eJVM 116 and one or more applets 114 are already installed on the second embedded computer device 112 and, in step 708, the second embedded computer device 112 receives one or more updates for those existing installations. In other embodiments, the second embedded computer device 112 does not have an existing installation of eJVM 116 and one or more applets 114 and, in step 708, embedded application updater 106 transmits to installer application on the second embedded computer device 112 the updated version of eJVM 116 and one or more applets 114.

In step 710, the second embedded computer device 112 performs the operational steps of FIG. 3, as previously discussed. During the performance of the operational steps of FIG. 3, host communications device driver 108 transmits the state information stored in state information data store 110 to eJVM 116 on the second embedded computer device 112 when requested, and host communications device driver 108 transmits a start instruction to eJVM 116 on the second embedded computer device 112 after restoration of the state information is complete.

In step 712, host communications device driver 108 receives from eJVM 116 on the second embedded computer device 112 the notification indicating that the second embedded computer device 112 is available to accept new requests. After step 712, host communications device driver 108 can then transmit to eJVM 116 on the second embedded computer device 112 any requests that have been queued while the first embedded computer device 112 was suspended.

Accordingly, in this exemplary embodiment, a CEAU and migration are performed in a combined fashion: eJVM 116 and one or more applets 114 are updated on the second embedded computer device 112, and state information exported by the first embedded computer device 112 is restored on the second embedded computer device 112. The second embedded computer device 112 can therefore resume operating at the point at which the first embedded computer device 112 was suspended, without interruption from the perspective of host application 104. The first embedded computer device 112 can then be disconnected from host computer device 102.

Figure 8:
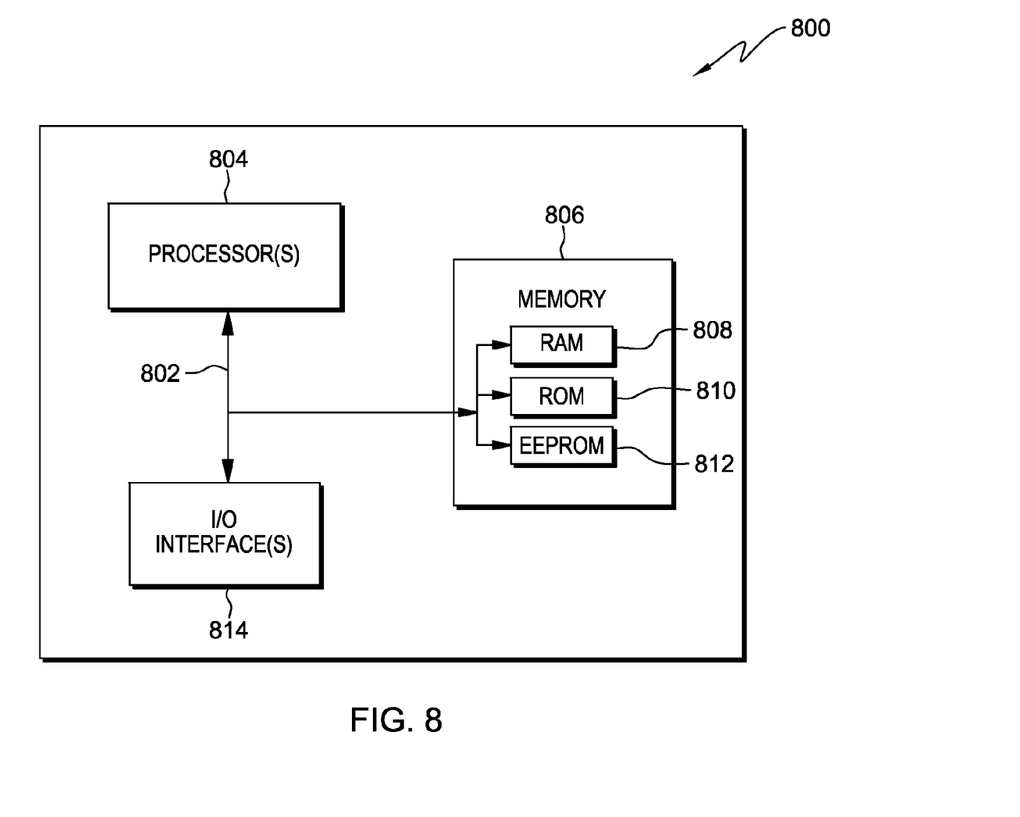
FIG. 8 is a block diagram of internal components of the embedded computer device of FIG. 1 in accordance with an embodiment of the present invention.

FIG. 8 is a block diagram of internal components 800 of embedded computer device 112 in accordance with an embodiment of the present invention. FIG. 8 provides only an illustration of one implementation and does not imply any limitation with regard to the environments in which different embodiments of the present invention may be implemented. Many modifications to the depicted environment may be made based on design and implementation requirements. Examples of embedded computer devices that may be represented by FIG. 8 include smartcards, SIM cards, credit cards, security badges, and any other computer device having embedded hardware and software components.

Internal components 800 include one or more buses 802, which provide for communications between one or more processors 804, memory 806, and one or more input/output (I/O) interfaces 814. Memory 806 includes multiple computer-readable tangible storage devices. Computer-readable tangible storage devices are capable of storing information such as data, program code in functional form, and/or other suitable information on a temporary basis and/or permanent basis. Memory 806 includes random access memory (RAM) 808 (which can include BBRAM), read-only memory (ROM) 810, and electrically erasable programmable read-only memory (EEPROM) 812, such as flash memory. One or more applets 114, eJVM 116, installer application 118, and daemon 120 are stored in memory 806 for execution by one or more processors 804.

One or more I/O interfaces 814 allow for input and output of data with host computer device 102 and other devices that may be connected to embedded computer device 112. For example, I/O interfaces 814 can support contact and contactless communications with host computer device 102, and I/O interfaces 814 can support communications with host computer device 102 via an acceptance device (not shown), such as, for example, a USB smartcard reader.

Figure 9:
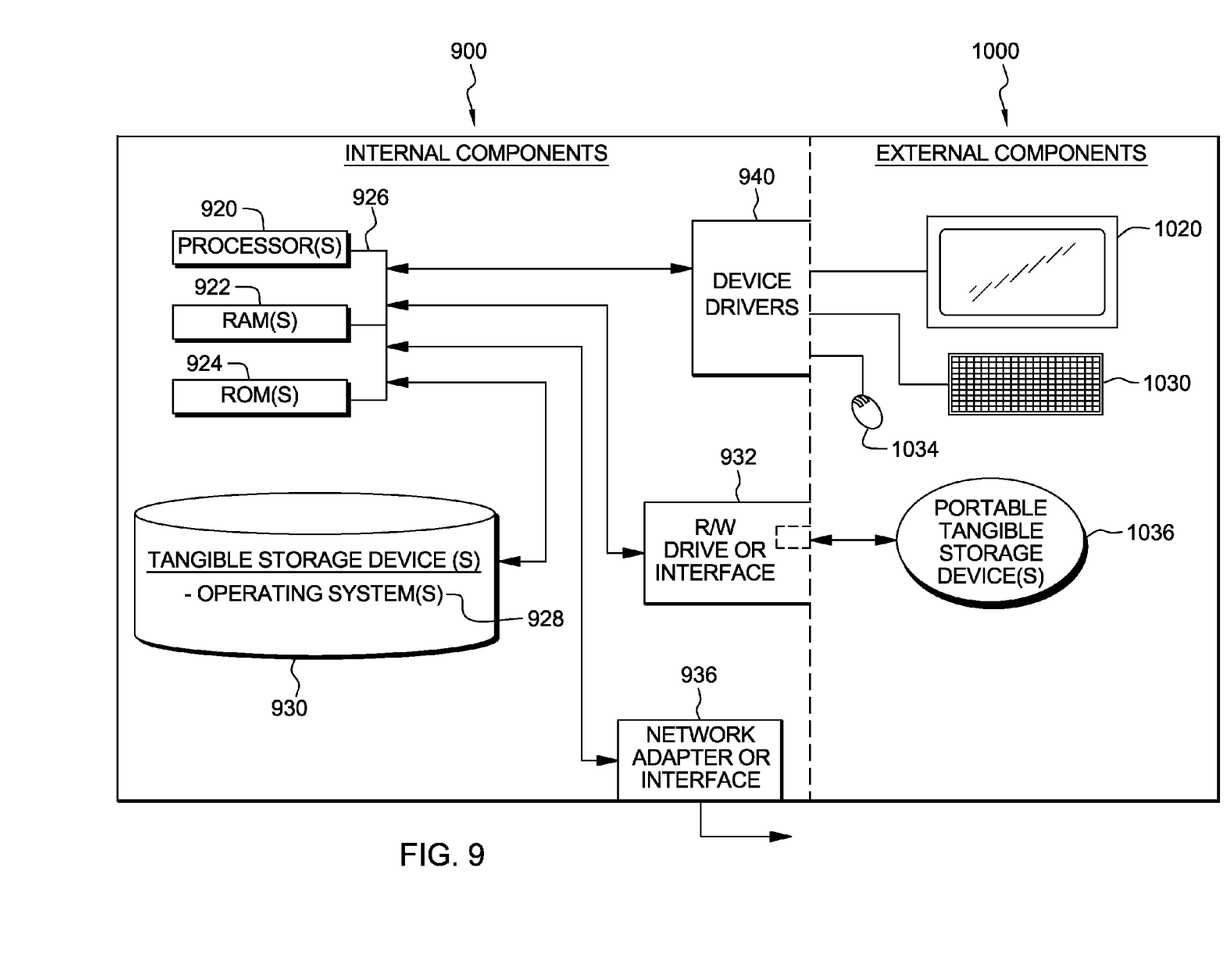
FIG. 9 is a block diagram of internal and external components of the host computer device of FIG. 1 in accordance with an embodiment of the present invention.

FIG. 9 is a block diagram of internal components 900 and external components 1000 of host computer device 102 in accordance with an embodiment of the present invention. FIG. 9 provides only an illustration of one implementation and does not imply any limitations with regard to the environments in which different embodiments may be implemented. Examples of computer devices, environments, and/or configurations that may be represented by FIG. 9 include, but are not limited to, cellular telephones, tablet computers, laptop computers, desktop computers, server computers, thin clients, thick clients, multiprocessor systems, microprocessor-based systems, and distributed cloud computing environments that include any of the above systems or devices.

Internal components 900 include one or more processors 920, one or more computer-readable RAMs 922 and one or more computer-readable ROMs 924 on one or more buses 926, one or more operating systems 928 and one or more computer-readable tangible storage devices 930. Host application 104, embedded application updater 106, and data in state information data store 110 are stored on one or more of the respective computer-readable tangible storage devices 930 for access and/or execution by one or more of the respective processors 920 via one or more of the respective RAMs 922 (which typically include cache memory). In the illustrated embodiment, each of the computer-readable tangible storage devices 930 is a magnetic disk storage device of an internal hard drive. Alternatively, each of the computer-readable tangible storage devices 930 is a semiconductor storage device such as ROM 924, EEPROM, flash memory or any other computer-readable tangible storage device that can store a computer program and digital information. A computer-readable tangible storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Internal components 900 also include a R/W drive or interface 932 to read from and write to one or more portable computer-readable tangible storage devices 1036 such as a CD-ROM, DVD, memory stick, magnetic tape, magnetic disk, optical disk or semiconductor storage device. Host application 104, embedded application updater 106, host communications device driver 108, and data in state information data store 110 can be stored on one or more of the respective portable computer-readable tangible storage devices 1036, read via the respective R/W drive or interface 932 and loaded into the respective hard drive or semiconductor storage device 930.

Internal components 900 also include a network adapter or interface 936 such as a TCP/IP adapter card or wireless communication adapter (such as a 4G wireless communication adapter using OFDMA technology). Host application 104, embedded application updater 106, host communications device driver 108, and data in state information data store 110 can be downloaded to the respective computing/processing devices from an external computer or external storage device via a network (for example, the Internet, a local area network or other, wide area network or wireless network) and network adapter or interface 936. From the network adapter or interface 936, the programs and data can be loaded into the respective hard drive or semiconductor storage device 930. The network may comprise copper wires, optical fibers, wireless transmission, routers, firewalls, switches, gateway computers and/or edge servers.

External components 1000 include a display screen 1020, a keyboard or keypad 1030, and a computer mouse or touchpad 1034. Internal components 900 also include device drivers 940, to interface to display screen 1020 for imaging, to keyboard or keypad 1030, to computer mouse or touchpad 1034, and/or to display screen 1020 for pressure sensing of alphanumeric character entry and user selections. Device drivers 940 also include host communications device driver 108 to interface to embedded computer device 112 (not shown), which can be internal or external to host computer device 102. The device drivers 940, R/W drive or interface 932 and network adapter or interface 936 comprise hardware and software (stored in storage device 930 and/or ROM 924).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java®, C, and C++. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor limit the invention to the precise form disclosed. Many modifications and variations of the present invention are possible. Such modifications and variations that may be apparent to a person skilled in the art of the invention are intended to be included within the scope of the invention as defined by the accompanying claims.

What is claimed is:

1. A method for updating software on an embedded computer device, the method comprising the steps of:
    an embedded computer device executing an applet in an embedded virtual machine;
    suspending new requests to the applet;
    transmitting state information for the embedded virtual machine or the applet from the embedded computer device to a host computer device;
    receiving one or more software updates for the embedded virtual machine or the applet from the host computer device;
    installing the one or more software updates received from the host computer device; and subsequently
    the embedded computer device receiving the state information from the host computer device, restoring the state information received from the host computer device, and allowing new requests to be sent to the applet.

2. The method of claim 1, further comprising the step of:
the embedded computer device selecting state information to be sent to the host computer device for the embedded virtual machine or the applet that has a storage size that exceeds an available storage capacity of nonvolatile storage on the embedded computer device.

3. The method of claim 1, further comprising the step of:
the embedded computer device selecting state information to be sent to the host computer device for the embedded virtual machine or the applet that includes cryptographic state information.

4. The method of claim 1, wherein the step of allowing new requests to be sent to the applet comprises:
transmitting a notification indicating that the embedded computer device is available to accept new requests to the applet to the host computer device.

5. The method of claim 1, further comprising the step of:
receiving an instruction to enter into a suspension state from the host computer device.

6. A computer system for updating software on an embedded computer device, the computer system comprising:
one or more processors, one or more computer-readable memories, one or more computer-readable tangible storage devices, and program instructions stored on at least one of the one or more computer-readable tangible storage devices, wherein at least one of the one or more processors performs the method of claim 1 by executing the program instructions via at least one of the one or more computer-readable memories.

7. A computer program product for updating software on an embedded computer device, the computer program product comprising:
one or more computer-readable tangible storage devices and program instructions stored on at least one of the one or more computer-readable tangible storage devices, the program instructions comprising:
program instructions to execute an applet in an embedded virtual machine;
program instructions to suspend new requests to the applet;
program instructions to transmit state information for the applet to a host computer device;
program instructions to receive one or more software updates for the applet from the host computer device;
program instructions to install the one or more software updates received from the host computer device;
program instructions to receive the state information from the host computer device;
program instructions to restore the state information received from the host computer device; and
program instructions to allow new requests to be sent to the applet.

8. The computer program product of claim 7, further comprising program instructions stored on at least one of the one or more computer-readable tangible storage devices to:
select state information to be sent to the host computer device for the applet that has a storage size that exceeds an available storage capacity of nonvolatile storage on the embedded computer device.

9. The computer program product of claim 7, further comprising program instructions stored on at least one of the one or more computer-readable tangible storage devices to:
select state information to be sent to the host computer device for the applet that includes cryptographic state information.

10. The computer program product of claim 7, wherein the program instructions to allow new requests to be sent to the applet comprise:
program instructions to transmit a notification indicating that the embedded computer device is available to accept new requests to the applet to the host computer device.

11. The computer program product of claim 7, further comprising program instructions stored on at least one of the one or more computer-readable tangible storage devices to:
receive an instruction to enter into a suspension state from the host computer device.

12. The computer program product of claim 7, further comprising program instructions stored on at least one of the one or more computer-readable tangible storage devices to:
transmit state information for the embedded virtual machine to the host computer device.

13. A method for updating software on an embedded computer device, the method comprising the steps of:
a host computer device determining to update an embedded virtual machine or an applet on an embedded computer device, wherein the embedded computer device is executing the applet in the embedded virtual machine;
initiating suspension of the embedded computer device;
receiving state information for the embedded virtual machine or the applet from the embedded computer device;
transmitting one or more software updates for the embedded virtual machine or the applet to the embedded computer device; and subsequently
transmitting the state information that was received from the embedded computer device to the embedded computer device to be restored on the embedded computer device.

14. The method of claim 13, wherein the state information comprises state information that has a storage size that exceeds an available storage capacity of nonvolatile storage on the embedded computer device.

15. The method of claim 13, wherein the state information comprises cryptographic state information.

16. The method of claim 13, wherein the step of initiating suspension of the embedded computer device comprises:
instructing the embedded computer device to enter into a suspension state in which the embedded computer device suspends new requests to the applet and transmits state information for the embedded virtual machine or the applet to the host computer device.

17. The method of claim 13, further comprising the step of:
receiving a notification indicating that the embedded computer device is available to accept new requests to the applet from the embedded computer device.

18. The method of claim 13, wherein the step of transmitting the state information that was received from the embedded computer device to the embedded computer device to be restored on the embedded computer device comprises:
transmitting the state information that was received from the embedded computer device and an encrypted symmetric encryption key with which the embedded computer device can decrypt the state information to the embedded computer device.

19. A computer system for updating software on an embedded computer device, the computer system comprising:
one or more processors, one or more computer-readable memories, one or more computer-readable tangible storage devices, and program instructions stored on at least one of the one or more computer-readable tangible storage devices, wherein at least one of the one or more processors performs the method of claim 13 by executing the program instructions via at least one of the one or more computer-readable memories.

20. A computer program product for updating software on an embedded computer device, the computer program product comprising:
    one or more computer-readable tangible storage devices, and program instructions stored on at least one of the one or more computer-readable tangible storage devices, wherein at least one processor performs the method of claim 13 by executing the program instructions via at least one computer-readable memory.

\* \* \* \* \*